US012186949B2

(12) United States Patent
Fujinaka et al.

(10) Patent No.: US 12,186,949 B2
(45) Date of Patent: Jan. 7, 2025

(54) METHOD FOR MANUFACTURING ROTARY POWER TRANSMISSION MEMBER

(71) Applicant: Hitachi Astemo, Ltd., Ibaraki (JP)

(72) Inventors: Satoshi Fujinaka, Ibaraki (JP); Haruka Yoshioka, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 829 days.

(21) Appl. No.: 17/175,859

(22) Filed: Feb. 15, 2021

(65) Prior Publication Data

US 2021/0162639 A1 Jun. 3, 2021

Related U.S. Application Data

(63) Continuation of application No. PCT/JP2018/038537, filed on Oct. 16, 2018.

(30) Foreign Application Priority Data

Sep. 7, 2018 (JP) .................................. 2018-167947

(51) Int. Cl.
*B29C 45/16* (2006.01)
*B29C 45/27* (2006.01)
(Continued)

(52) U.S. Cl.
CPC ............. *B29C 45/16* (2013.01); *F16H 55/06* (2013.01); *F16H 55/22* (2013.01);
(Continued)

(58) Field of Classification Search
CPC ........ B29C 45/1615; B29C 2045/1617; B29C 45/1618; B29C 2045/1623; F16H 55/22;
(Continued)

(56) References Cited

U.S. PATENT DOCUMENTS 4,570,897 A * 2/1986 Von Holdt ............... B65D 1/12
249/162
4,914,711 A * 4/1990 Rubinstein ............. G03B 17/52
384/419

(Continued)

FOREIGN PATENT DOCUMENTS

DE 10 2014 210 781 A1 12/2015
JP H11-156892 A 6/1999
(Continued)

OTHER PUBLICATIONS

International Search Report and Written Opinion of the International Search Report for PCT/JP2018/038537 dated Dec. 18, 2018.
(Continued)

*Primary Examiner* — Emmanuel S Luk
*Assistant Examiner* — Elisa H Vera
(74) *Attorney, Agent, or Firm* — KENEALY VAIDYA LLP

(57) ABSTRACT

Provided is a method for manufacturing a rotary power transmission member including a ring-shaped main body part fixed to a rotating shaft, and a ring-shaped gear part formed on an outer circumference part of the main body part to transmit rotational force of the rotating shaft to other members. The method includes gear part molding for injecting a high melting point resin into a first mold to mold the gear part, and main body part molding for injecting a low melting point resin to mold the main body part while the gear part being inserted into a second mold. The first mold includes a runner defined on an inner circumference side of a ring-shaped cavity for molding the gear part, and a gate which communicates the runner with the cavity to supply a resin into the cavity.

16 Claims, 7 Drawing Sheets

(51) Int. Cl.
    *B29K 101/12*     (2006.01)
    *B29L 15/00*     (2006.01)
    *F16H 55/06*     (2006.01)
    *F16H 55/22*     (2006.01)
    *F16H 57/00*     (2012.01)

(52) U.S. Cl.
    CPC .......... *F16H 57/0025* (2013.01); *B29C 45/27* (2013.01); *B29K 2101/12* (2013.01); *B29L 2015/003* (2013.01); *F16H 2055/065* (2013.01)

(58) Field of Classification Search
    CPC .. F16H 55/06; F16H 57/0025; F16H 2055/06; B29L 2015/003
    See application file for complete search history.

(56) References Cited

U.S. PATENT DOCUMENTS

2004/0226396 A1     11/2004    Noguchi
2016/0327145 A1*   11/2016    Yanagisawa ............ F16H 55/06
2017/0120487 A1     5/2017     Brochot et al.

FOREIGN PATENT DOCUMENTS

| | | |
|---|---|---|
| JP | 2004-52791 A | 2/2004 |
| JP | 2004-338140 A | 12/2004 |
| JP | 2017-82858 A | 5/2017 |
| WO | 2020/049750 A1 | 3/2020 |

OTHER PUBLICATIONS

German Office Action for the related German Patent Application No. 11 2018 007 964.3 dated Feb. 1, 2022.

* cited by examiner

METHOD FOR MANUFACTURING ROTARY POWER TRANSMISSION MEMBER

CROSS-REFERENCE TO RELATED APPLICATIONS

This application is a continuation application of PCT/JP 2018/038537, filed on Oct. 16, 2018, which claims the benefit of priority to Japanese Patent Application No. 2018-167947, filed with the Japan Patent Office on Sep. 7, 2018, the disclosures of all of which are hereby incorporated by reference in their entireties.

TECHNICAL FIELD

The present invention relates to a method for manufacturing a rotary power transmission member.

BACKGROUND OF THE INVENTION

As shown in a patent literature below, a rotary power transmission member such as a worm wheel, which is made of a resin material, has been developed in recent years. The rotary power transmission member disclosed in the Patent literature includes a main body part made of a fiber-reinforced resin (low melting point resin), and a gear part made of a resin (high melting point resin) having a melting point higher than that of the fiber-reinforced resin. Further, a method for manufacturing a rotary power transmission member disclosed in the Patent Literature below includes firstly molding the main body part with the low melting point resin by injection molding, and then, injecting the high melting point resin in a mold, where the main body part has been inserted, to integrally mold the gear part and the main body part.

CITATION LIST

Patent Literature

Patent Literature: Japanese Patent Application Publication No. 2004-52791

SUMMARY OF THE INVENTION

However, with the method for manufacturing described above, a mold, in which the gear part is molded, has a ring-shaped cavity, and the main body part is inserted on the inner circumference side of the cavity. Therefore, a runner and a gate cannot be arranged on the inner circumference side of the cavity. For this reason, the runner and gate are arranged on the side surface of the cavity (side surface of the gear part) (see FIGS. 3 and 4 of the Patent Literature above), and a volume or a surface area of the runner and gate is increased. As a result, the resin injected from an injection machine is easily cooled in the runner and gate, which may lead to instability in quality of a molded product. Further, a large amount of resin remains in the runner and gate, and improvement in a yield rate is desired.

The present invention is to solve problems as described above, and provides a method for manufacturing a rotary power transmission member, to prevent a resin injected at the time of molding a gear part from being easily cooled and to improve a yield rate.

To solve the problem described above, a method for manufacturing a rotary power transmission member of the present invention including a ring-shaped main body part fixed to a rotating shaft, and a ring-shaped gear part formed on an outer circumference of the main body part to transmit a rotational force of the rotating shaft to other members, the method including: gear part molding for injecting a high melting point resin into a first mold to mold the gear part, and main body part molding for injecting a low melting point resin to mold the main body part while the gear part being inserted into a second mold, wherein the first mold includes a runner defined on an inner circumference side of a ring-shaped cavity for molding the gear part, and a gate which communicates the runner with the cavity to supply a resin into the cavity.

The present invention causes a volume or a surface area of a runner and a gate of a first mold to be reduced. Accordingly, a resin injected from an injection machine is hard to be cooled in the runner and gate so that quality of a molded product (gear part) is stabilized and a yield rate is improved.

DETAILED DESCRIPTION OF PREFERRED EMBODIMENTS

Figure 1:
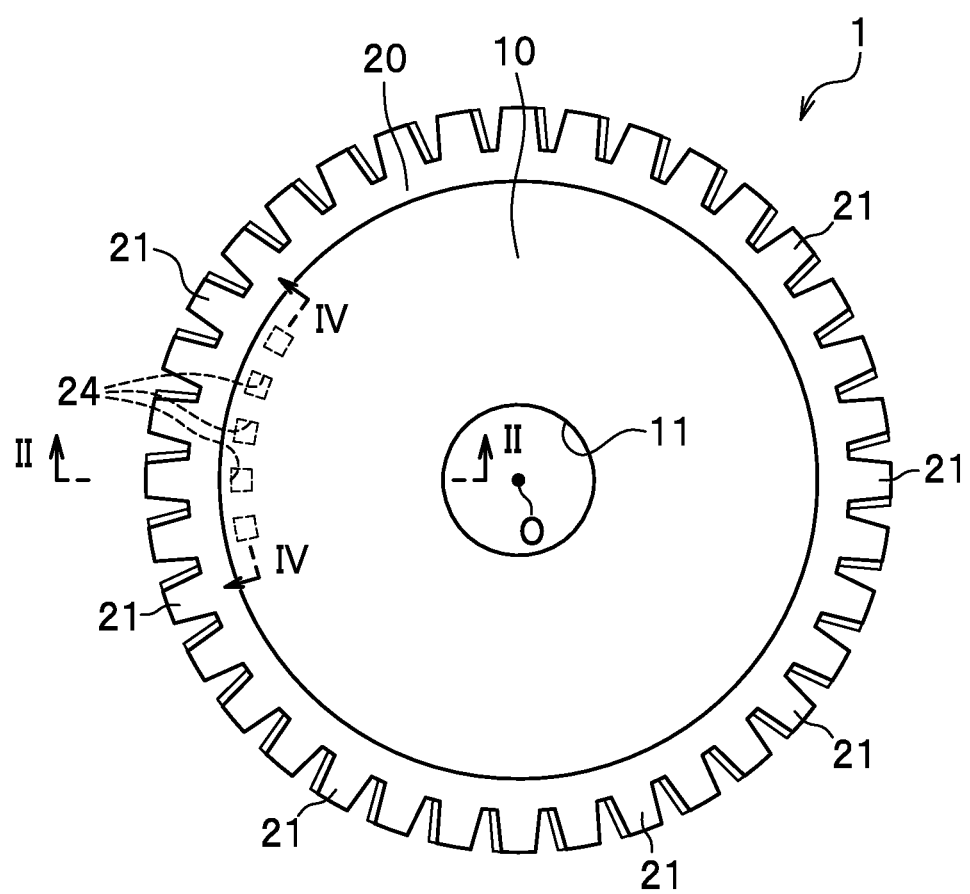
FIG. 1 is a plan view of a worm wheel of a first embodiment as viewed from an axial direction.

Hereinafter, a description is given of embodiments of the present invention. Note that technical elements common to embodiments are denoted by the same reference numerals, and descriptions thereof are omitted. Further, in the embodiments, worm wheels 1, 1A are described as a rotary power transmission member, but the present invention is not limited thereto.

First Embodiment

As shown in FIG. 1, the worm wheel 1 is a component made of resin having a substantially disk shape about an axis O and has a circular through hole 11 at the center thereof. The through hole 11 is a part into which a rotating shaft (not shown) is fittingly inserted. Further, a plurality of teeth 21 are formed on the outer circumference surface of the worm wheel 1, and each of the teeth 21 is twisted so as to be displaced circumferentially toward the axis O direction.

Note that, the teeth 21 of the present embodiment are twisted circumferentially, but the shape of the teeth 21 is not limited thereto in the present invention, as long as the teeth 21 mesh with teeth of a worm gear (not shown) to transmit power.

Further, a recess 21a, which is recessed radially inward, is formed at the center in the axial direction of each tooth 21 (see FIG. 2), which causes the tooth 21 less likely to interfere (contact) with a shaft of the worm gear (not shown). Note that each tooth 21 of the present embodiment has the recess 21a, but the tooth of the present invention may not have any recess.

The worm wheel 1 includes a ring-shaped main body part 10 having the through hole 11 formed therein, and a ring-shaped gear part 20 formed around the outer circumference of the main body part 10 and having the plurality of teeth 21 formed on the outer circumference surface thereof.

Figure 2:
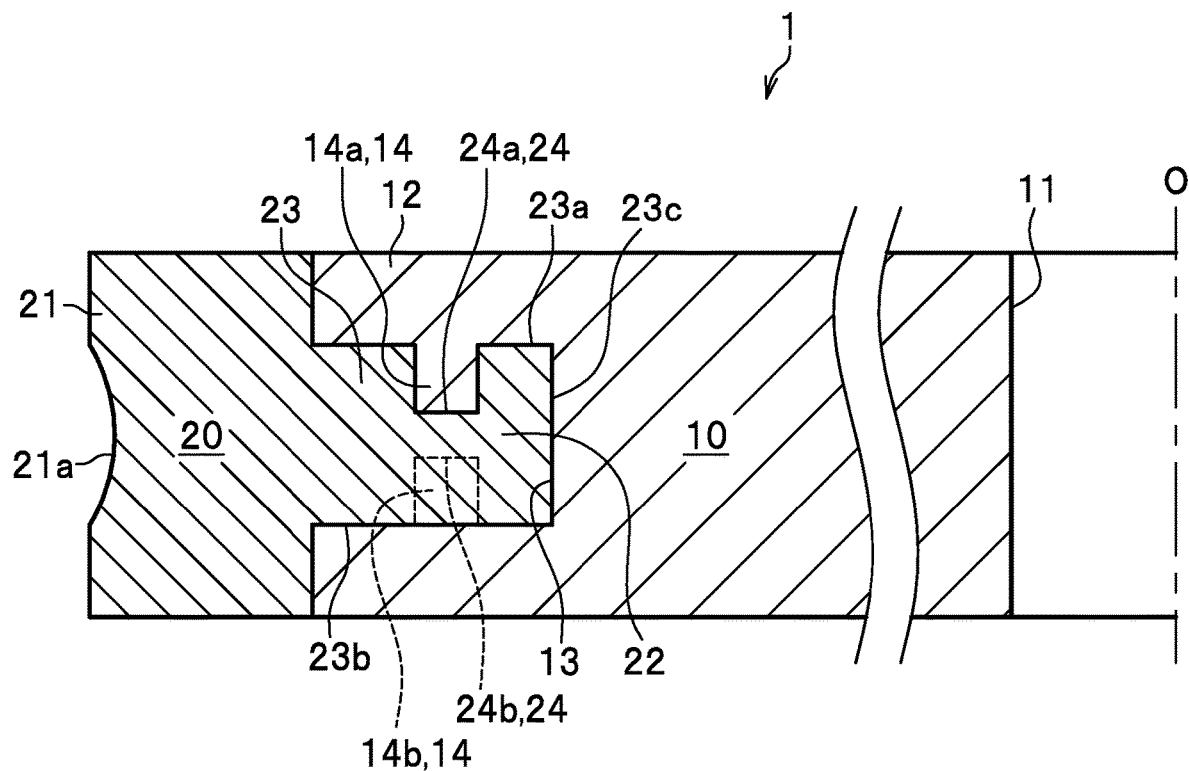
FIG. 2 is a cross-sectional view taken along a line II-II in FIG. 1.

As shown in FIG. 2, the main body part 10 and the gear part 20 are joined to each other by an engaged part 12 formed in the outer circumference of the main body part 10 and an engaging part 22 formed in the inner circumference of the gear part 20.

Hereinafter, the engaging part 22 and the engaged part 12 are described in this order. Further, in the following description, the axis O direction may be referred to as a thickness direction.

The engaging part 22 includes an extending part 23, which extends radially inward from the center in the thickness direction of the inner circumference surface of the gear part 20, and a plurality of recessed parts 24 formed with the extending part 23 partially recessed.

Figure 3:
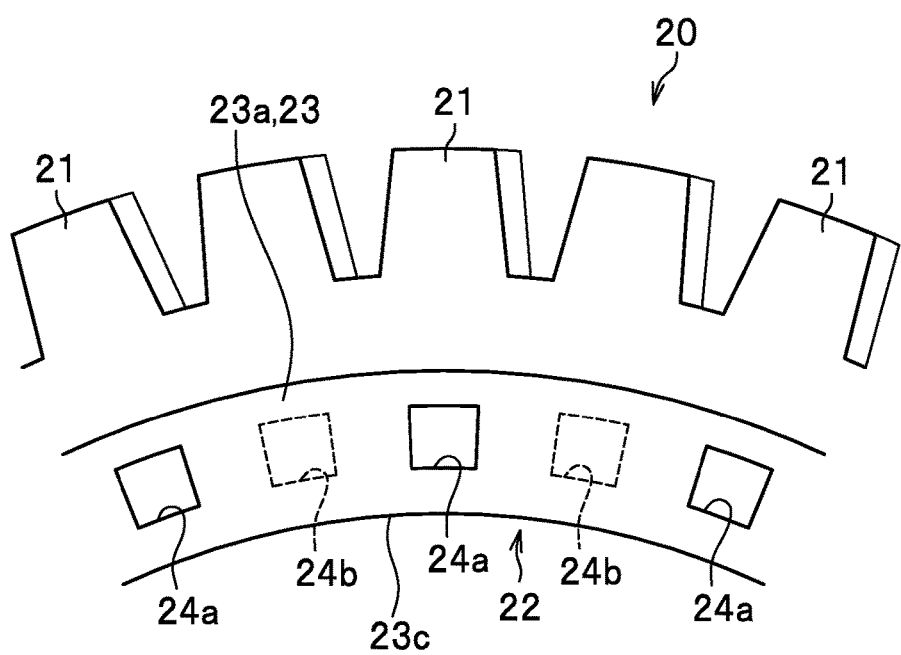
FIG. 3 is a partially enlarged plan view of a gear part, picked out of the worm wheel, as viewed from the axial direction.

As shown in FIG. 3, the extending part 23 extends circumferentially along the inner circumference surface of the gear part 20 to have a ring shape. Further, the extending part 23 includes one side surface 23a which has a ring shape on one side in the thickness direction and the other side surface 23b (see FIG. 2) which has a ring shape on the other side in the thickness direction.

The recessed part 24 is a rectangular recess as viewed from the thickness direction and is formed at a position radially outward away from an inner circumference edge 23c of the extending part 23. Note that, in the present invention, the shape of the recessed part 24 as viewed from the thickness direction is not limited to rectangular, and may be circular, elliptical, or polygonal (including triangular).

Figure 4:
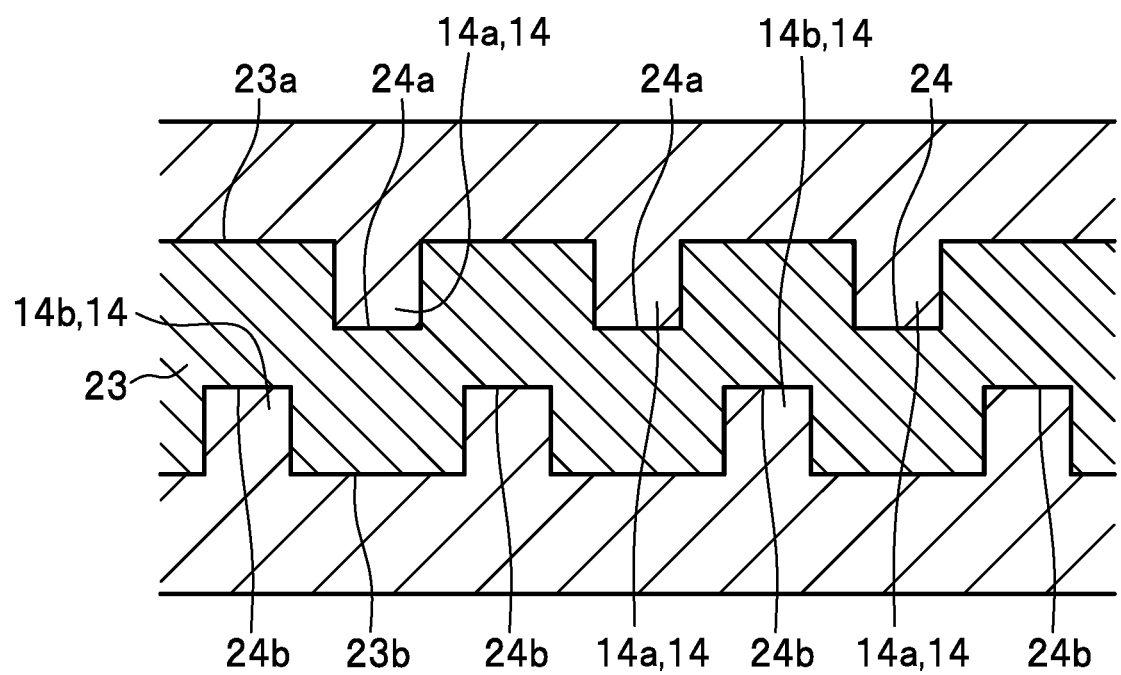
FIG. 4 is a cross-sectional view taken along a line IV-IV in FIG. 1.

As shown in FIGS. 3 and 4, each recessed part 24 includes a first recessed part 24a formed on the one side surface 23a and a second recessed part 24b formed on the other side surface 23b of the extending part 23. As shown in FIG. 4, the first recessed parts 24a and second recessed parts 24b are circumferentially formed alternately so as not to align with each other in the thickness direction.

As shown in FIG. 2, the engaged part 12 includes a peripheral groove 13, which is recessed radially inward from the center in the thickness direction of the outer circumference surface of the main body part 10, and a plurality of protruding parts 14, which protrude in the thickness direction from the inner surface of the peripheral groove 13.

The peripheral groove 13 extends circumferentially into which the extending part 23 of the gear part 20 is inserted. Therefore, the gear part 20 engages with the main body part 10 in the thickness direction so that the main body part 10 and the gear part 20 do not move relative to (separate from) each other in the thickness direction.

Further, as shown in FIG. 4, each protruding part 14 includes a first protruding part 14a, which is inserted in the first recessed part 24a to engage therewith, and a second protruding part 14b, which is inserted in the second recessed part 24b to engage therewith.

Therefore, the protruding parts 14 and the recessed parts 24 are engaged with each other circumferentially and radially so that the main body part 10 and the gear part 20 are not rotated relative to each other. Further, the main body part 10 and the gear part 20 are not radially separated from each other.

Next, a description is given of resin materials forming the main body part 10 and the gear part 20.

The main body part 10 and the gear part 20 are formed by injection molding to be described later, and are made of resin materials each having thermoplasticity.

The main body part 10 occupies a most area of the worm wheel 1, and the rigidity of the main body part 10 is almost equivalent to the rigidity of the worm wheel 1. Therefore, a resin material satisfying predetermined rigidity is selected as a resin material of the main body part 10.

Meanwhile, as a resin material forming the gear part 20, a resin material (referred to as a high melting point resin hereinafter), which melts at a higher temperature than the resin material forming the main body part 10, in other words, a hard resin material is selected. From the above description, the gear part 20 has abrasion resistance while the rigidity of the worm wheel 1 (main body part 10) is maintained.

Specifically, examples of thermoplastic resin materials, which can be used for the main body part 10 and the gear part 20, include polyamide (hereinafter referred to as "PA") 6 (melting point is at 220° C.), PA12 (melting point is at 176° C.), PA11 (melting point is at 187° C.), PA612 (melting point is at 215° C.), PA610 (melting point is at 215° C.), PA410 (melting point is at 250° C.), PA66 (melting point is at 265° C.), and PA46 (melting point is at 290° C.) Note that, as described above, resin materials are selected among the resin materials described above, such that the resin material forming the gear part 20 has a higher melting point than that forming the main body part 10.

Further, in the present invention, the resin material (hereinafter, referred to as a low melting point resin) forming the main body part 10 may be a fiber-reinforced resin containing reinforced fibers such as glass fibers and carbon fibers in the resin material described above, to ensure predetermined rigidity.

Next, a description is given of a method for manufacturing the worm wheel 1.

The method for manufacturing the worm wheel 1 includes: a gear part molding step of molding the gear part 20; and a main body part molding step of molding the main body part 10 after the completion of the gear part molding step.

In the gear part molding step, a melted high melting point resin is injected in a cavity (space) S1 defined in a first mold 30, and the resin is cooled to mold the gear part 20.

Figure 5:
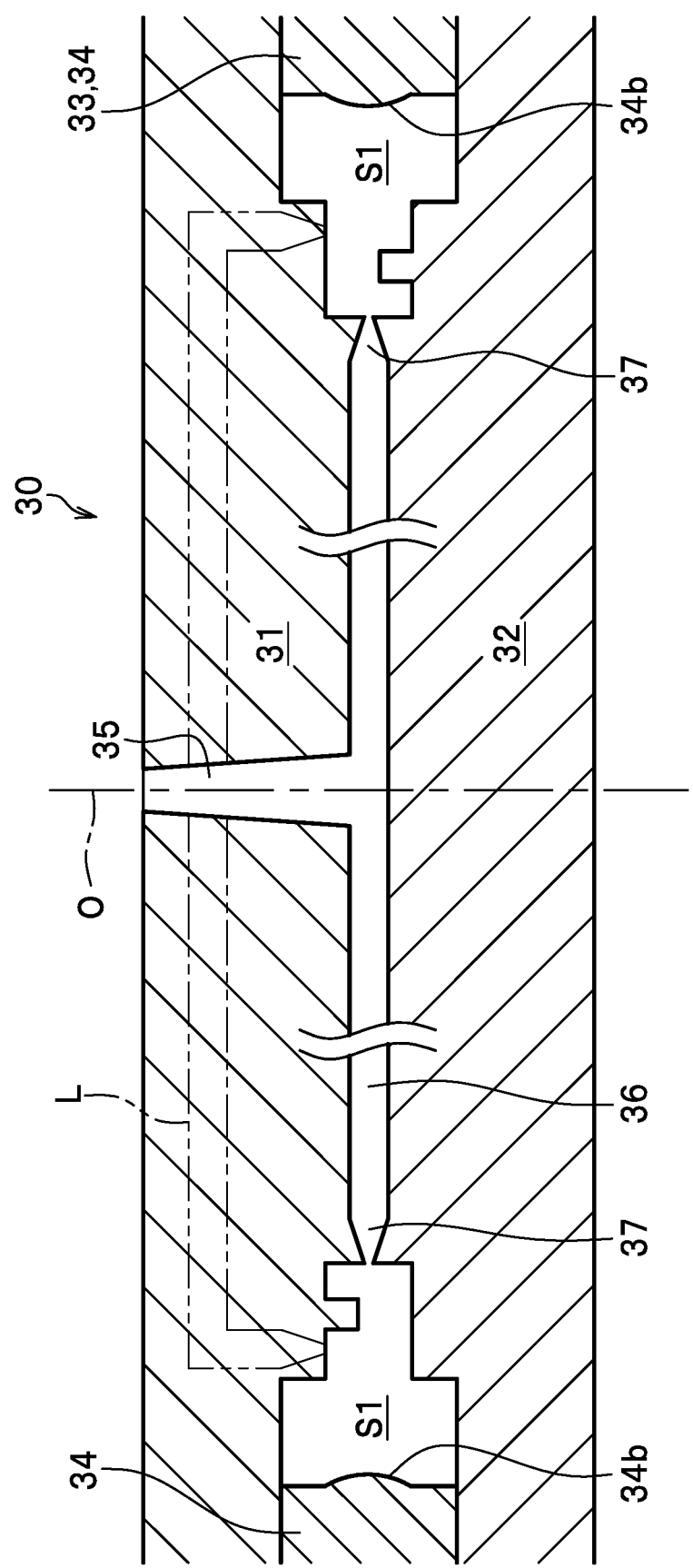
FIG. 5 is a cross-sectional view of a first mold used for a gear part molding step, taken along the axial direction.

As shown in FIG. 5, the cavity S1 of the first mold 30 is formed to have the same shape as the gear part 20. The first mold 30 includes a first upper mold 31 defining the upper side of the cavity S1, a first lower mold 32 defining the lower side of the cavity S1, and a first radially outer mold 33 defining the outer circumference of the cavity S1. Thus, the teeth 21 of the gear part 20 are molded by the first radially outer mold 33.

Figure 6A:
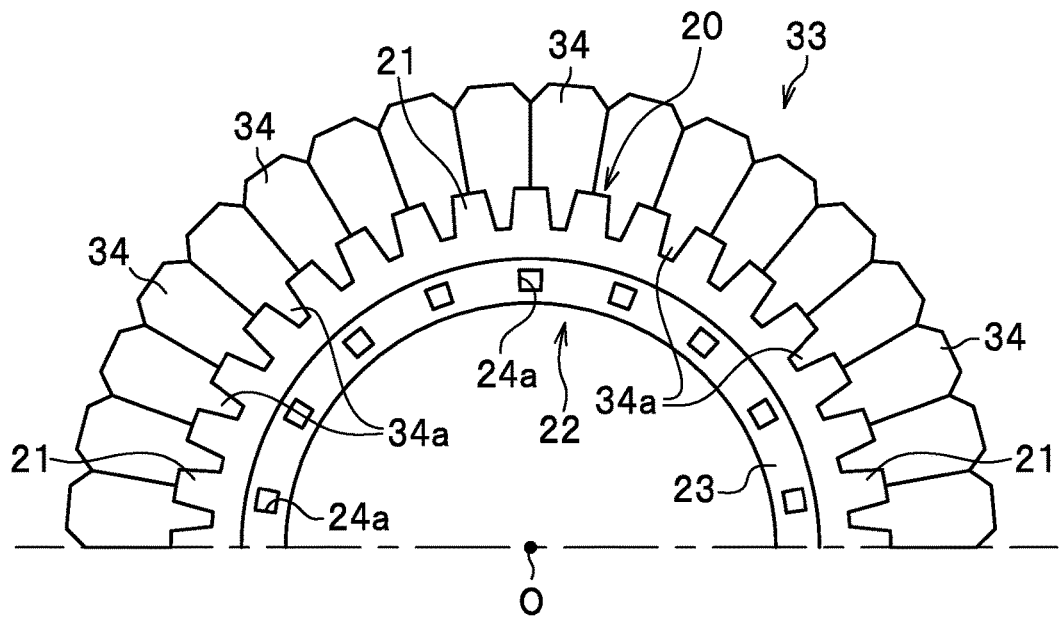
FIG. 6A is a plan view of a resin (gear part) and a first radially outer mold after being hardened, as viewed from the axial direction.

As shown in FIG. 6A, the first radially outer mold 33 includes a plurality of split cores 34 which are split circumferentially. Each split core 34 includes a trapezoidal first protrusion 34a as viewed from the axis O direction to form a tooth trace. Further, each split core 34 is slidable radially outward. Still further, as shown in FIG. 5, each split core 34 is formed with a second protrusion 34b, with which the recess 21a (see FIG. 2) of the tooth 21 is formed. Note that the second protrusions 34b are not shown in FIGS. 6A and 6B.

As shown in FIG. 5, the first mold 30 includes a first sprue 35, a first runner 36, and a first gate 37 through which the resin injected from an injection machine (not shown) flows into the cavity S1.

The first sprue 35 is a through hole which penetrates the first upper mold 31 vertically, and is on the axis O. The first runner 36 and the first gate 37 are defined by a recess in the lower surface of the first upper mold 31 and a recess in the upper surface of the first lower mold 32.

The first runner 36 is continuous with the lower end of the first sprue 35, has a circular shape as viewed from the axis O direction, and is defined on the inner circumference side of the cavity S1.

The first gate 37 forms a ring-shaped flow path, which communicates the outer circumference side of the first runner 36 with the inner circumference side of the cavity S1, in other words, a disk gate. Further, the first gate 37 is continuous with the inner circumference side of the cavity S1, more specifically, at the position where the extending part 23 of the gear part 20 is formed, which corresponds to the center of the inner circumference surface of the extending part 23.

Figure 6B:
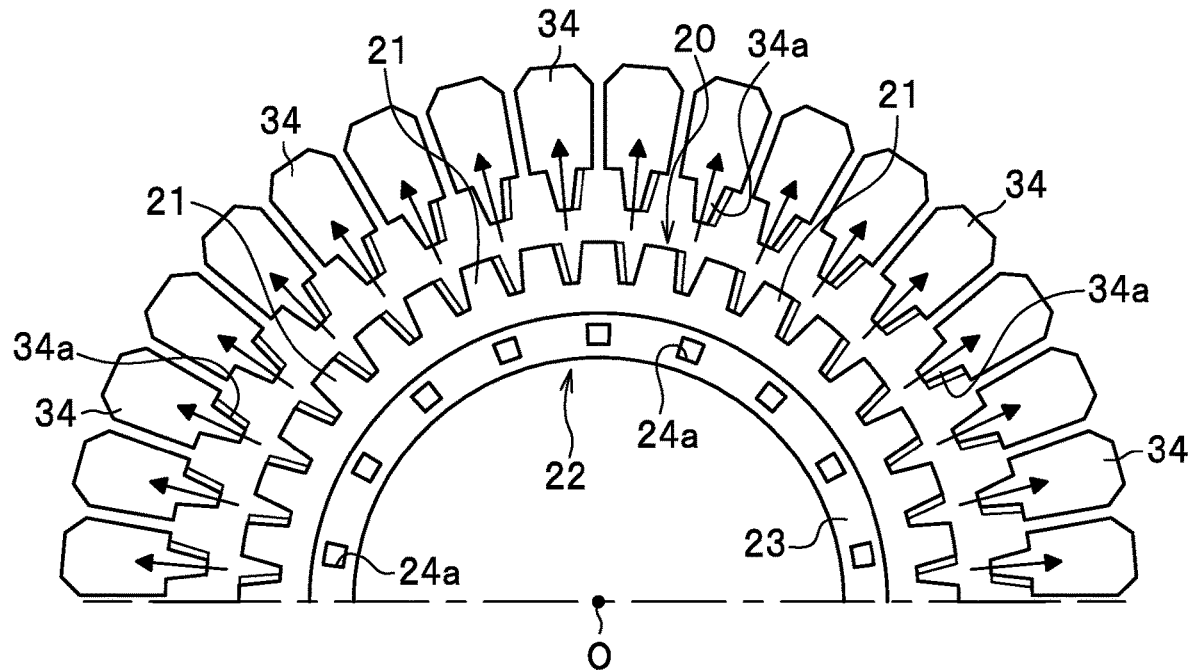
FIG. 6B is a plan view showing a state in which split cores of the first radially outer mold are separated, as viewed from the axial direction.

A description is given of the procedure of the gear part molding step. The high melting point resin is injected into the first sprue 35 from the injection machine (not shown). Accordingly, the high melting point resin flows through the first runner 36 and the first gate 37 into the cavity S1. Once the cavity S1 is filled up with the high melting point resin, the injection by the injection machine is stopped and the resin is cooled. When the high melting point resin is hardened, the first upper mold 31 is moved upward, and as shown in FIG. 6B, the split cores 34 are slid radially outward. Accordingly, the gear part 20 is formed and the gear part molding step is completed.

In the main body part molding step, the gear part 20 formed in the previous step is inserted into a second mold 40, and the low melting point resin is injected into a cavity S2 of the second mold 40 to mold the main body part 10.

Figure 7:
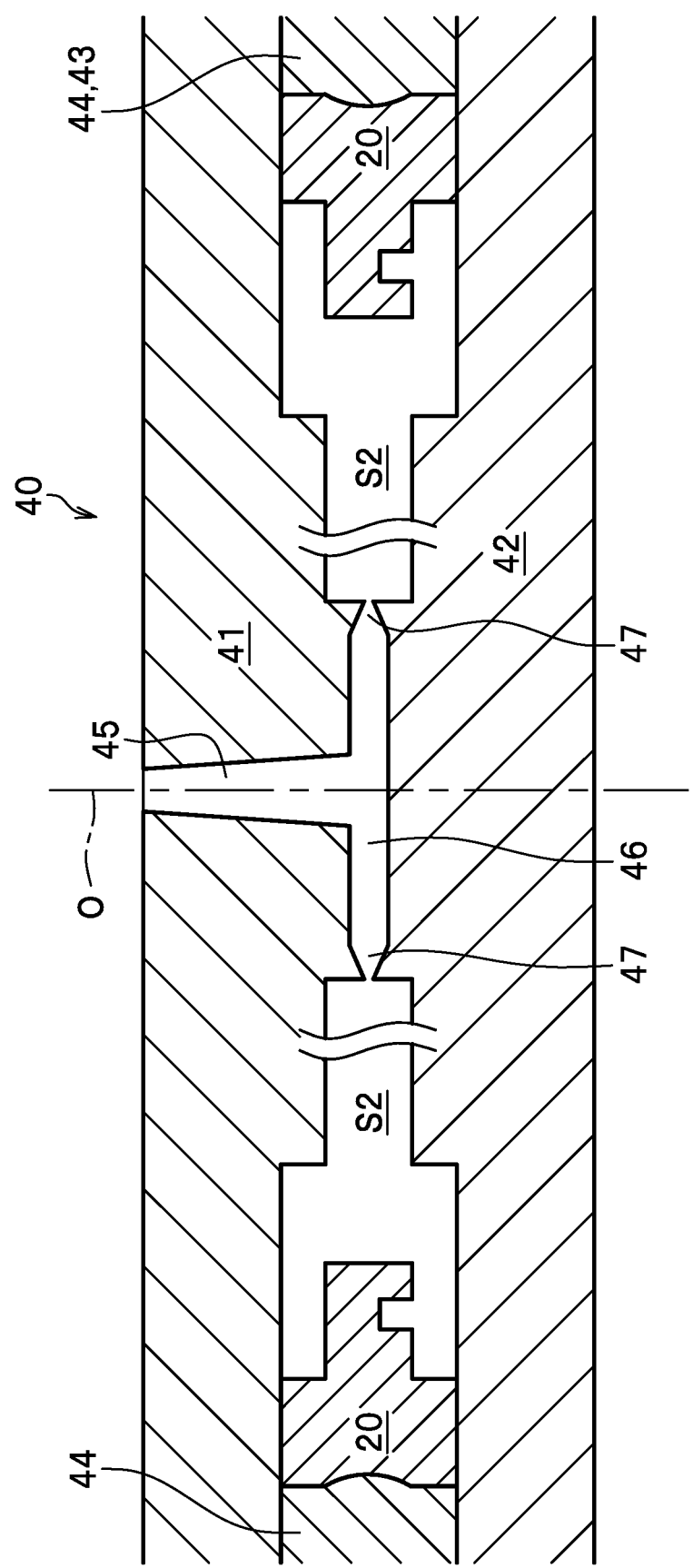
FIG. 7 is a cross-sectional view of a second mold used for a main body part molding step, taken along the axial direction.

As shown in FIG. 7, the cavity S2 of the second mold 40 is defined to have the same shape as the worm wheel 1. The second mold 40 includes a second upper mold 41 defining the upper side of the cavity S2, a second lower mold 42 defining the lower side of the cavity S2, and a second radially outer mold 43 defining the outer circumference of the cavity S2. Note that the second radially outer mold 43 includes a plurality of split cores 44 which are slidable radially outward, as with the first radially outer mold 33.

The second mold 40 includes a second sprue 45, a second runner 46, and a second gate 47 through which the resin injected from the injection machine (not shown) flows into the cavity S2.

The second sprue 45 is a through hole which penetrates the second upper mold 41 vertically, and is on the axis O. The second runner 46 and the second gate 47 are defined by a combination of a recess in the lower surface of the second upper mold 41 and a recess in the upper surface of the second lower mold 42.

The second runner 46 is a circular space in planar view, which extends radially outward from the lower end of the second sprue 45 and is defined on the inner circumference side of the cavity S2 (main body part 10). The second gate 47 is a ring-shaped flow path (disk gate), which communicates the second runner 46 with the cavity S2. Further, the second gate 47 is communicated with the inner circumference of the cavity S2 at the center in the thickness direction of the inner circumference surface of the main body part 10.

A description is given of the procedure of the main body part molding step. The gear part 20 is inserted on the outer circumference side of the cavity S2 in the second mold 40. Then, the low melting point resin is injected into the second sprue 45 from the injection machine (not shown). Accordingly, the low melting point resin flows through the second runner 46 and the second gate 47 into the cavity S2. Once the cavity S2 is filled up with the low melting point resin, the injection by the injection machine is stopped and the resin is cooled. When the low melting point resin is hardened, the second upper mold 41 is moved upward, and the split cores 44 are slid radially outward. Thus, the main body part 10, which is integrally molded with the gear part 20, is molded. Finally, the worm wheel 1 is formed and the main body part molding step is completed.

Next, a description is given of advantageous effects of the first embodiment.

In the conventional art, when the gear part is molded, the main body part is inserted on the inner circumference side of the cavity. Therefore, the runner and gate are arranged on the side (in the axis O direction) of the gear part, and the runner and gate each have a bottomed cylindrical shape (see a two-dot chain line L in FIG. 5).

Meanwhile, according to the present embodiment, the first runner 36 and first gate 37 of the first mold 30 to be used for molding the gear part 20 are defined on the inner circumference side of the cavity S1, and the first runner 36 and first gate 37 each have a substantially disk shape. Accordingly, the first runner 36 and first gate 37 of the present embodiment are reduced in volume and surface area than the runner and gate in the conventional art.

That is, according to the present embodiment, the resin injected from the injection machine is hard to be cooled in the first runner 36 and first gate 37 so that the quality of the molded product (gear part 20) is stabilized. Further, the resin remaining in the first runner 36 and first gate 37 is reduced so that a yield rate is improved.

Further, according to the present embodiment, the gear part 20 inserted into the second mold 40 is made of a high melting point resin. Therefore, even when the low melting point resin is injected into the cavity S2 to mold the main body part 10 integrally with the gear part 20, the gear part 20 is hard to be deformed.

Still further, when the teeth 21 of the gear part 20 are molded by the first upper mold 31 or the like which is moved vertically (along the axis O), the teeth 21 (tooth traces) may be twisted or the recess 21a may be formed in the teeth 21. Therefore, the first upper mold 31 or the like may come into contact with the teeth 21 and the teeth 21 may be partly broken or deformed. Meanwhile, the split cores 34 of the first radially outer mold 33 and the split cores 44 of the second radially outer mold 43 in the present embodiment are separated radially outward, so that the first protrusions 34a and second protrusions 34b do not come into contact with the teeth 21 at the time of being separated. Accordingly, breakage or deformation of the teeth 21 can be avoided.

Yet further, according to the present embodiment, the main body part 10 and the gear part 20 are joined by the engaged part 12 and the engaging part 22, which increases joining strength so as to be used for a long period of time.

Second Embodiment

Next, a description is given of a second embodiment.

Figure 8:
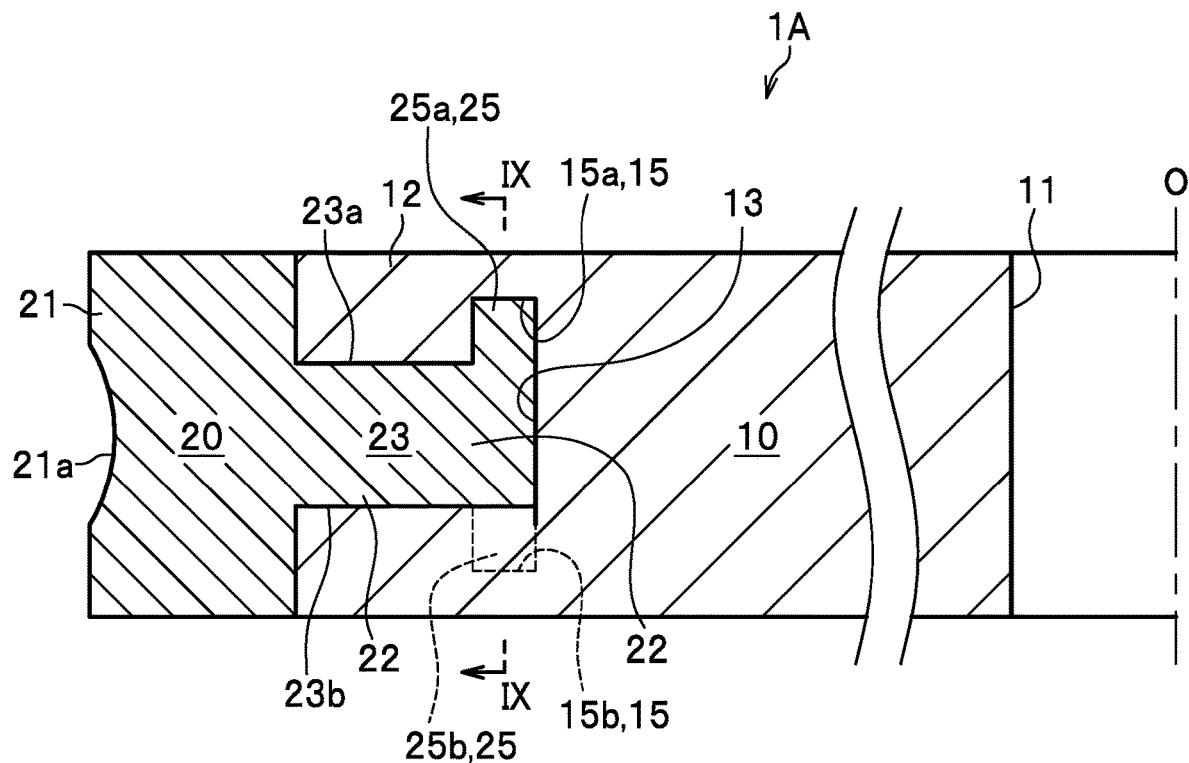
FIG. 8 is a cross-sectional view of the worm wheel of a second embodiment, taken along the diameter thereof.
Figure 9:
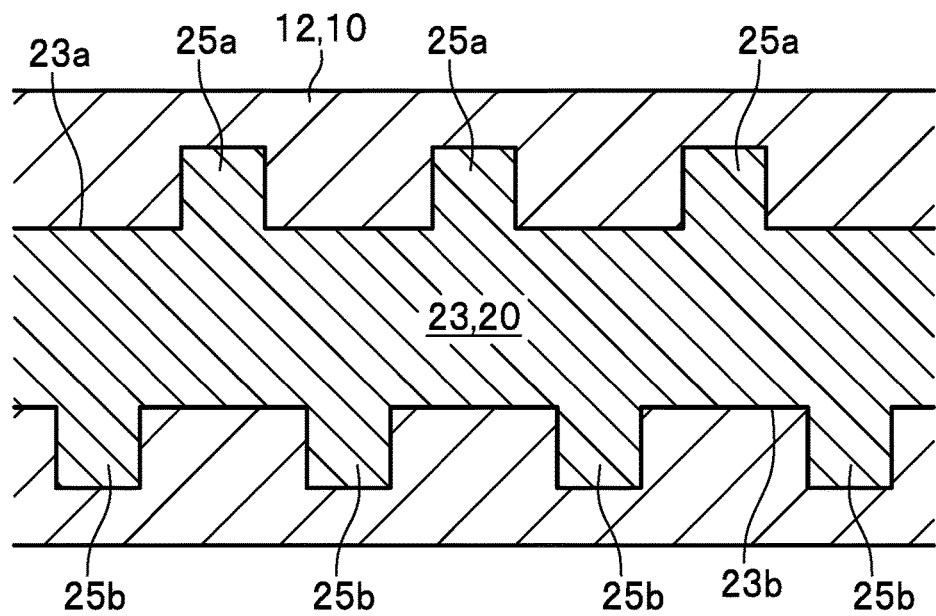
FIG. 9 is a cross-sectional view taken along a line IX-IX shown in FIG. 8.

As shown in FIGS. 8 and 9, a worm wheel 1A of the second embodiment differs from the worm wheel 1 of the first embodiment in that the gear part 20 includes protruding parts 25 protruding from the extending part 23, in place of the plurality of recessed parts 24 (see FIGS. 2 to 4) formed to have the extending part 23 partially recessed. Further, the worm wheel 1A of the second embodiment differs from the worm wheel 1 of the first embodiment in that the main body part 10 includes recessed parts 15 formed to have the inner surface of the peripheral groove 13 recessed in the thickness direction, in place of the plurality of protruding parts 14 (see FIGS. 2 to 4) protruding from the inner surface of the peripheral groove 13. Hereinafter, the worm wheel 1A of the second embodiment is described, focusing on the differences from the first embodiment.

The protruding part 25 includes a first protruding part 25a protruding from the one side surface 23a and a second protruding part 25b protruding from the other side surface 23b of the extending part 23. Further, the first protruding part 25a and the second protruding part 25b are arranged so as not to align with each other in the thickness direction.

The recessed part 15 includes a first recessed part 15a into which the first protruding part 25a is inserted to engage therewith, and a second recessed part 15b into which the second protruding part 25b is inserted to engage therewith.

Even with the configuration described above, the main body part 10 and the gear part 20 are integrally molded to avoid them from being rotated relative to each other. Further, the main body part 10 and the gear part 20 are not separated from each other in the radial direction.

Thus, according to the worm wheel 1A of the second embodiment, the coupling strength between the main body part 10 and the gear part 20 is high so that the worm wheel 1A can be used for a long period of time.

Third Embodiment

Next, a description is given of a third embodiment.

The third embodiment differs from the first mold of the first embodiment in that the first mold used in the gear part molding step is a spoke-shaped mold. Note that the first mold 30 of the first embodiment includes the first runner 36 and the first gate 37 having a circular shape as viewed from the axis O and is a so-called disk shape. Hereinafter, a description is given of details of the first mold used in the gear part molding step of the third embodiment.

Though not particularly shown, the first mold of the third embodiment includes a first sprue, first runners, and first gates as flow paths, through which a resin injected from the injection machine flows into the cavity.

The first sprue is a hole vertically penetrating a first upper mold, and the lower end thereof is defined on the inner circumference side of the cavity. Note that the first sprue is the same as the first sprue 35 of the first embodiment.

The first runners extend radially outward from the lower end of the first sprue. Further, a plurality of first runners are defined circumferentially about the lower end of the first sprue.

The first gates serve as flow paths to communicate the outer circumference of the first runners with the inner circumference of the cavity and are formed as many as the first runners.

From the description above, the first runners and first gates of the third embodiment form radial flow paths about the lower end of the first sprue, to supply the resin from the inner circumference side of the cavity. Therefore, the spoke-shaped first mold of the third embodiment has a smaller volume and surface area than the runner and gate of a conventional art. The resin injected from the injection machine is hard to be cooled in the first runners and first gates, and the quality of the molded product (gear part 20) is stabilized. Further, the amount of resin remaining in the first runners and first gates is reduced so that the yield rate is improved.

The embodiments have been described above, but the present invention is not limited thereto.

The present invention is intended to achieve that the resin injected at the time of molding the gear part 20 is hard to be cooled and the yield rate is improved. The present invention is not limited to examples shown in the embodiments, to have the configuration of the main body part 10 and the flow path of the second mold 40 for the resin.

That is, the present invention may include the main body part 10 having a configuration in which a press-fitting collar to be press-fitted onto a shaft is provided on the radially innermost part. To avoid the press-fitting collar, the flow paths of the second mold 40 for the resin may have a pin gate shape, in place of a disk shape or a spoke shape as described above, and a plurality of gates may be formed above the cavity to supply the resin from above the cavity.

Further, the split core 34 shown in FIGS. 6A and 6B includes one first protrusion 34a to form a tooth trace. Therefore, the number of split cores 34 is the same as that of teeth 21 of the worm wheel 1, but the split core 34 may be modified to include two first protrusions 34a, for example, to reduce the number of the split cores 34.

Still further, the first mold 30 of the embodiments includes the first radially outer mold 33 having a plurality of split cores 34, and the second mold 40 includes the second radially outer mold 43 having a plurality of split cores 44, but the present invention is not limited thereto. That is, if the teeth 21 of the rotary power transmission member (worm wheel 1) are not twisted circumferentially and the recess 21a is not formed in the tooth 21, a mold may be used, which includes an upper mold (first upper mold 31, second upper mold 41) and a lower mold (first lower mold 32, second lower mold 42).

REFERENCE NUMERALS 1, 1A: worm wheel, 10: main body part, 12: engaged part, 13: peripheral groove, 14: protruding part, 15: recessed part, 20: gear part, 21: tooth, 22: engaging part, 23: extending part, 24: recessed part, 25: protruding part, 30: first mold, 33: first radially outer mold, 34: split core, 35: first sprue, 36: first runner, 37: first gate, 40: second mold, 43: second radially outer mold, 44: split core, 45: second sprue, 46: second runner, 47: second gate, S1: cavity, S2: cavity

What is claimed is:

1. A method for manufacturing a rotary power transmission member including a ring-shaped main body part fixed to a rotating shaft, and a ring-shaped gear part formed on an outer circumference of the main body part to transmit a rotational force of the rotating shaft to other members, the main body part being made of a first resin material and the gear part being made of a second resin material that is different from the first resin material, the method comprising:

gear part molding for injecting a high melting point resin as the second resin material into a first mold to mold the gear part that includes a plurality of teeth formed on an outer circumference of the gear part, and main body part molding for injecting a low melting point resin as the first resin material into a second mold to mold the main body part while the gear part being inserted into the second mold such that an entirety of each of the teeth is exposed outside of the first resin material, wherein the first mold includes a runner defined on an inner circumference side of a ring-shaped cavity for molding the gear part, and a gate which communicates the runner with the cavity to supply a resin into the cavity.

2. The method for manufacturing a rotary power transmission member according to claim 1, wherein the gate is a disk gate.

3. The method for manufacturing a rotary power transmission member according to claim 1,
wherein the rotary power transmission member is a worm wheel,
the first mold includes a radially outer mold for molding a tooth of the worm wheel, and
the radially outer mold includes a plurality of split cores which are split circumferentially.

4. The method for manufacturing a rotary power transmission member according to claim 2,
wherein the rotary power transmission member is a worm wheel,
the first mold includes a radially outer mold for molding a tooth of the worm wheel, and
the outer circumference mold includes a plurality of split cores which are split circumferentially.

5. The method for manufacturing a rotary power transmission member according to claim 1,
wherein an engaged part is formed in an outer circumference of the main body part, and
an engaging part, which engages with the engaged part, is formed in an inner circumference of the gear part.

6. The method for manufacturing a rotary power transmission member according to claim 2,
wherein an engaged part is formed in an outer circumference of the main body part, and
an engaging part, which engages with the engaged part, is formed in an inner circumference of the gear part.

7. The method for manufacturing a rotary power transmission member according to claim 3,
wherein an engaged part is formed in an outer circumference of the main body part, and
an engaging part, which engages with the engaged part, is formed in an inner circumference of the gear part.

8. The method for manufacturing a rotary power transmission member according to claim 4,
wherein an engaged part is formed in an outer circumference of the main body part, and
an engaging part, which engages with the engaged part, is formed in an inner circumference of the gear part.

9. The method for manufacturing a rotary power transmission member according to claim 5,
wherein the engaged part includes a peripheral groove recessed radially inward from an outer circumference surface of the main body part, and a protruding part protruding in an axial direction of the rotating shaft from an inner surface of the peripheral groove, and
the engaging part includes an extending part extending radially inward from an inner circumference surface of the gear part to be inserted in the peripheral groove, and a recessed part recessed in the axial direction from the extending part to engage with the protruding part.

10. The method for manufacturing a rotary power transmission member according to claim 6,
wherein the engaged part includes a peripheral groove recessed radially inward from an outer circumference surface of the main body part, and a protruding part protruding in an axial direction of the rotating shaft from an inner surface of the peripheral groove, and
the engaging part includes an extending part extending radially inward from an inner circumference surface of the gear part to be inserted in the peripheral groove, and a recessed part recessed in the axial direction from the extending part to engage with the protruding part.

11. The method for manufacturing a rotary power transmission member according to claim 7,
wherein the engaged part includes a peripheral groove recessed radially inward from an outer circumference surface of the main body part, and a protruding part protruding in an axial direction of the rotating shaft from an inner surface of the peripheral groove, and
the engaging part includes an extending part extending radially inward from an inner circumference surface of the gear part to be inserted in the peripheral groove, and a recessed part recessed in the axial direction from the extending part to engage with the protruding part.

12. The method for manufacturing a rotary power transmission member according to claim 8,
wherein the engaged part includes a peripheral groove recessed radially inward from an outer circumference surface of the main body part, and a protruding part protruding in an axial direction of the rotating shaft from an inner surface of the peripheral groove, and
the engaging part includes an extending part extending radially inward from an inner circumference surface of the gear part to be inserted in the peripheral groove, and a recessed part recessed in the axial direction from the extending part to engage with the protruding part.

13. The method for manufacturing a rotary power transmission member according to claim 5,
wherein the engaged part includes a peripheral groove recessed radially inward from an outer circumference surface of the main body part, and a recessed part recessed in an axial direction of the rotating shaft from an inner surface of the peripheral groove, and
the engaging part includes an extending part extending radially inward from an inner circumference surface of the gear part to be inserted in the peripheral groove, and a protruding part protruding in the axial direction from the extending part to engage with the recessed part.

14. The method for manufacturing a rotary power transmission member according to claim 6,
wherein the engaged part includes a peripheral groove recessed radially inward from an outer circumference surface of the main body part, and a recessed part recessed in an axial direction of the rotating shaft from an inner surface of the peripheral groove, and
the engaging part includes an extending part extending radially inward from an inner circumference surface of the gear part to be inserted in the peripheral groove, and a protruding part protruding in the axial direction from the extending part to engage with the recessed part.

15. The method for manufacturing a rotary power transmission member according to claim 7,
wherein the engaged part includes a peripheral groove recessed radially inward from an outer circumference surface of the main body part, and a recessed part recessed in an axial direction of the rotating shaft from an inner surface of the peripheral groove, and the engaging part includes an extending part extending radially inward from an inner circumference surface of the gear part to be inserted in the peripheral groove, and a protruding part protruding in the axial direction from the extending part to engage with the recessed part.

16. The method for manufacturing a rotary power transmission member according to claim 8, wherein the engaged part includes a peripheral groove recessed radially inward from an outer circumference surface of the main body part, and a recessed part recessed in an axial direction of the rotating shaft from an inner surface of the peripheral groove, and the engaging part includes an extending part extending radially inward from an inner circumference surface of the gear part to be inserted in the peripheral groove, and a protruding part protruding in the axial direction from the extending part to engage with the recessed part.

\* \* \* \* \*